C. L. MEYER.
CULINARY IMPLEMENT.
APPLICATION FILED AUG. 15, 1913.
1,098,747.
Patented June 2, 1914.
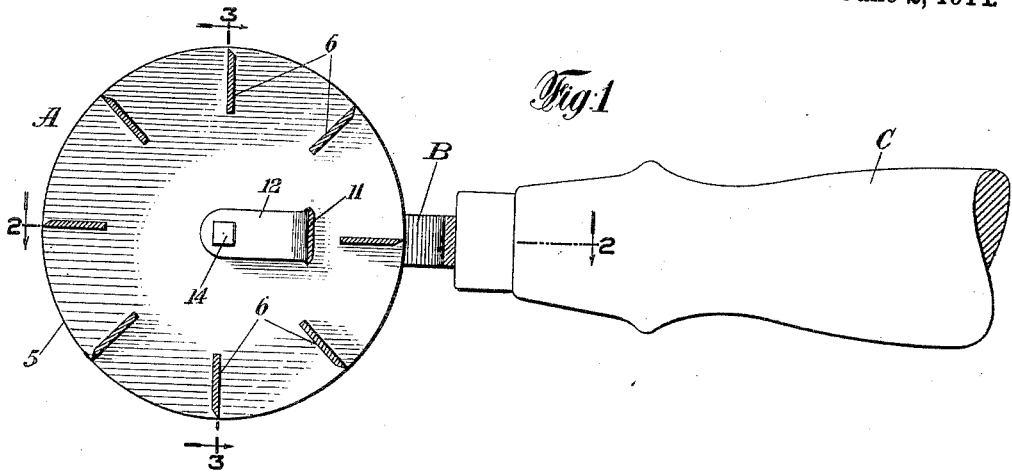
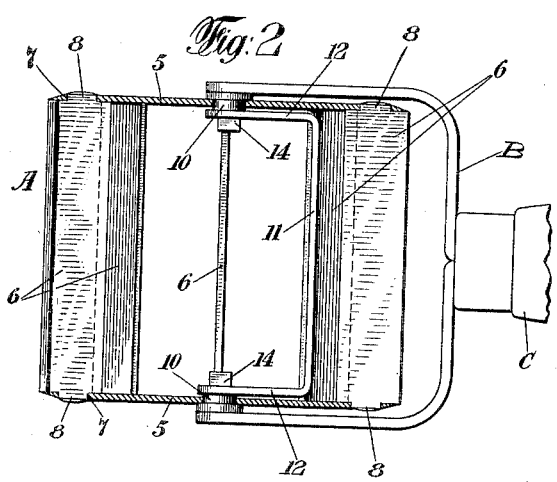
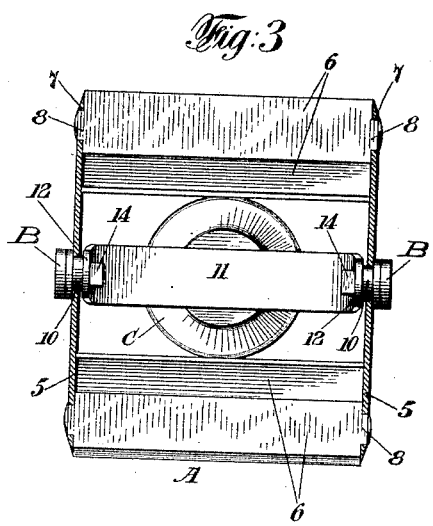
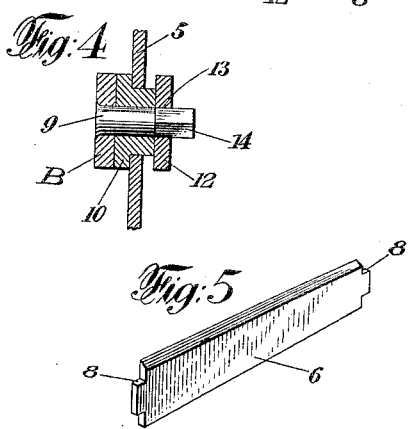
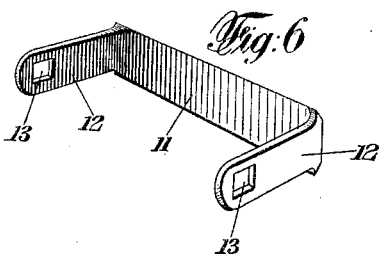
Witnesses:
John E. Prager
A. Worden Gibbs
Inventor
Charles L. Meyer
By his Attorney
John R. Nolan

UNITED STATES PATENT OFFICE.

CHARLES L. MEYER, OF NEW YORK, N. Y., ASSIGNOR TO ROTARY CHOPPER COMPANY, OF NEW YORK, N. Y., A CORPORATION OF NEW YORK.

CULINARY IMPLEMENT.

1,098,747. Specification of Letters Patent. Patented June 2, 1914.

Application filed August 15, 1913. Serial No. 784,927.

*To all whom it may concern:*

Be it known that I, CHARLES L. MEYER, a citizen of the United States, and resident of New York, in the county and State of New York, have invented certain new and useful Improvements in Culinary Implements, of which the following is a specification.

The object of this invention is to provide a culinary implement for chopping and mixing vegetables, fruit, meat and the like, which implement shall be cheap, simple and durable in its construction and efficient and practically noiseless in its operation; and which may be readily and thoroughly cleaned after using.

My invention comprises such an implement embodying in its construction a skeleton-like chopping roller having a succession of narrow longitudinally-disposed chopping blades about its periphery, an internally arranged cutting and mixing member co-acting with said blades, and a suitable operating handle having provisions whereby the roller is mounted rotatably, and the cutting member is supported in fixed relation to the path of the rotating chopping blades, as will be hereinafter described and claimed.

In the drawings—Figure 1 is a vertical section of a culinary implement embodying the preferred form of my invention, the section being on a plane transversely of the axis of the roller. Fig. 2 is a horizontal section, as on the line 2—2 of Fig. 1. Fig. 3 is a vertical section through the roller, as on the line 3—3 of Fig. 1. Fig. 4 is a sectional detail, enlarged, through one of the trunnion connections for the yoke, roller and cutting and mixing member. Fig. 5 is a perspective view of one of the chopping blades. Fig. 6 is a similar view of the internal cutting and mixing member.

A designates a skeleton-like chopping roller; B a yoke in and between the limbs of which the roller is mounted to rotate, and C a handle to which the yoke is secured; the construction and arrangement of the parts being such that the said roller can be rapidly rolled back and forth, and in intersecting paths, upon vegetables or other substances, in a manner to exert an effective chopping action thereon.

The roller structure comprises two circular end heads 5 in and between which a series of narrow blades 6 are fixedly supported in spaced relation to each other and parallel to the axis of rotation of the structure, so as to provide a succession of chopping members. Preferably the end heads comprise metal disks provided with suitably spaced apertures 7 into which are entered the reduced ends 8 of the blades. These ends project slightly beyond the outer faces of the disks and are conveniently expanded or riveted against the latter, thus effectually locking the blades and heads together. The outer edges of the blades lie flush with the peripheral edges of the end heads, or substantially so, and such edges of the blades and heads respectively are appropriately sharpened. The heads are centrally supported upon fixed studs or trunnions 9 on the limbs of the yoke B, so as to be freely rotatable on said studs or trunnions as an axis. Preferably each head is provided with a bushing 10 for the stud or trunnion. (See Fig. 4). Within the rotary structure and adjacent the inner edges of the blades, is supported a relatively-stationary longitudinally-disposed cutting and mixing member. This member comprises a blade 11 which is sharpened along its upper and lower edges as shown and is equipped at its ends with radial arms 12 which extend to and are supported on the trunnions 9, so as to be fixed thereby to the yoke and handle. In the present instance the arms are provided with square apertures 13 which are applied to similarly shaped extensions 14 of the respective trunnions. The arms may be affixed to the trunnions in any other suitable way.

By the construction above described it will be seen that as the rotary structure is actuated, by manipulation of the handle, the sharp edges of the end heads and radial blades rapidly act upon and chop up the underlying material; that the comminuted substance freely enters the structure, and that any relatively large bodies of material that may be thrown into the interior of the structure are subjected to the efficient action of the opposing edges of the internal stationary blade and the rotating radial blades. Thus such large bodies are effectively severed within the structure, therein commingled with the other reduced material passing therethrough, and the whole permitted to pass freely outward between the radial blades into position for repetition of the chopping, cutting and mixing operation.

The implement above described as typical of my invention, is simple, cheap, durable, practically noiseless and very efficient. It can be readily cleaned by holding it under an open water faucet in such position that the stream will impinge against the radial blades and rapidly rotate the roller in a manner to effect the removal therefrom of all clinging substances.

I claim:—

1. A culinary implement comprising end heads, narrow longitudinally-disposed chopping blades fixed in and between the said heads in spaced relation to each other to form a skeleton-like chopping roller, a handle to which the said roller is rotatably secured, and a cutting and mixing member fixedly supported within said roller in proximity to the path of the inner edges of the chopping blades.

2. A culinary implement comprising end heads, narrow longitudinally-disposed chopping blades fixed in and between the said heads in spaced relation to each other to form a skeleton-like chopping structure, a handle member having bearings upon which said heads are rotatably mounted, and an internal cutting and mixing member disposed in proximity to and longitudinally of said blades and fixedly secured to said bearings.

3. A culinary implement comprising end heads, narrow longitudinally-disposed chopping blades fixed in and between the same in spaced relation to each other to form a skeleton-like chopping structure, a handle member having short trunnions upon which the said heads are rotatably mounted, and a cutting and mixing blade adjacent the path of the inner edges of the chopping blades, said cutting and mixing blade having end arms fast on the inner ends of the trunnions.

Signed at New York in the county and State of New York, this 12th day of August A. D., 1913.

CHARLES L. MEYER.

Witnesses:
PIERRE A. NOÉ,
JOHN R. NOLAN.

Copies of this patent may be obtained for five cents each, by addressing the "Commissioner of Patents, Washington, D. C."